US005581865A

United States Patent [19]

Will

[11] Patent Number: 5,581,865

[45] Date of Patent: Dec. 10, 1996

[54] APPARATUS FOR APPLYING ANNULAR SEALS, GROMMETS, BUSHINGS, SLEEVES AND THE LIKE TO ASSOCIATED STRUCTURE

[75] Inventor: Terry M. Will, Bradenton, Fla.

[73] Assignee: Hi-Stat Manufacturing Co., Inc., Sarasota, Fla.

[21] Appl. No.: 382,700

[22] Filed: Feb. 2, 1995

Related U.S. Application Data

[62] Division of Ser. No. 55,584, May 3, 1993.

[51] Int. Cl.[6] ...................... B23P 19/02

[52] U.S. Cl. ...................... 29/235; 29/426.6; 29/447; 29/713; 269/48.1

[58] Field of Search ...................... 29/713, 720, 447, 29/235, 426.6, 722, 282, 263; 264/28; 269/48.1, 48.2, 48.3, 48.4

[56] References Cited

U.S. PATENT DOCUMENTS

| | | | |
|---|---|---|---|
| 2,241,609 | 5/1941 | McClelland et al. | 269/48.4 |
| 2,321,518 | 6/1943 | Rossmann | 269/48.3 |
| 5,042,787 | 8/1991 | Duffaud | 269/48.4 |
| 5,224,690 | 7/1993 | Vaught | 269/48.3 |
| 5,256,342 | 10/1993 | McMillan et al. | 29/447 |
| 5,265,456 | 11/1993 | Kennedy et al. | 29/447 |

FOREIGN PATENT DOCUMENTS

| | | | |
|---|---|---|---|
| 803986 | 7/1936 | France | 269/48.3 |
| 680232 | 8/1939 | Germany | 269/48.3 |
| 619174 | 3/1949 | United Kingdom | 269/48.3 |

*Primary Examiner*—Robert C. Watson
*Attorney, Agent, or Firm*—Lon H. Romanski

[57] ABSTRACT

A grommet or the like comprised of elastomeric material and having a passage formed therein is placed onto a mandrel which serves to resiliently expand the cross-sectional area of the passage; the mandrel while holding the passage to the expanded cross-sectional area places the grommet or the like in an area of cold temperature to effectively freeze the grommet or the like and thereby stabilize the expanded cross-sectional area by, through such freezing, eliminating the resilient characteristics of the elastomeric material; the stabilized grommet or the like, removed from the mandrel, is then easily slid onto a related cooperating carrier wherein the outer configuration and size of the carrier is less than that of the stabilized expanded cross-sectional area.

15 Claims, 6 Drawing Sheets

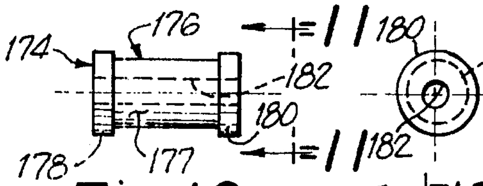
Fig. 10
Fig. 11
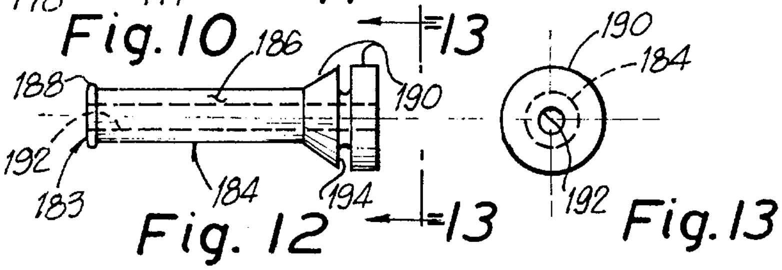
Fig. 12
Fig. 13
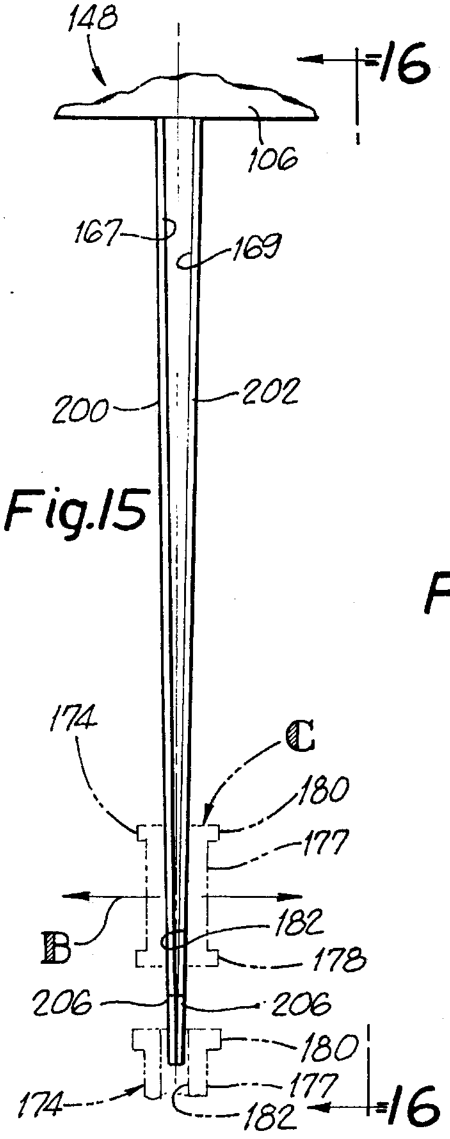
Fig. 15
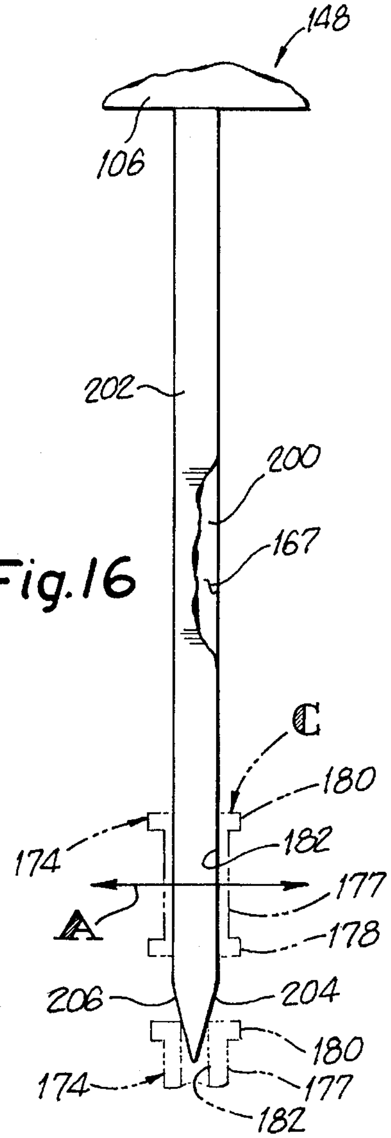
Fig. 16
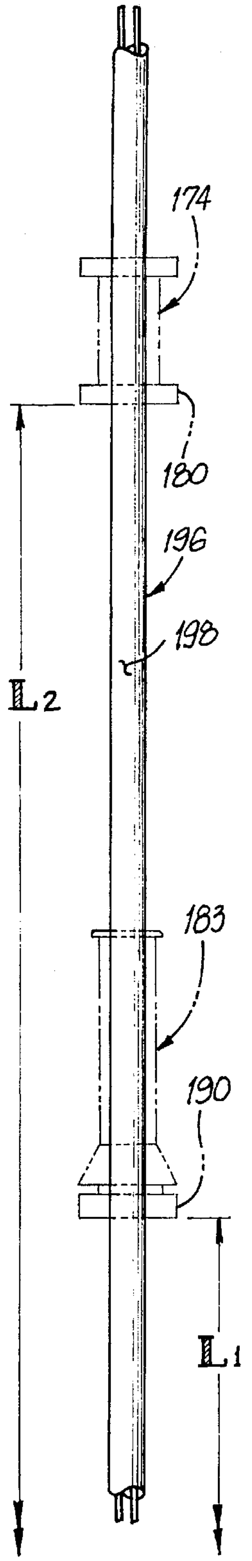
Fig. 14

APPARATUS FOR APPLYING ANNULAR SEALS, GROMMETS, BUSHINGS, SLEEVES AND THE LIKE TO ASSOCIATED STRUCTURE

RELATED APPLICATION

This application is a division of my application Ser. No. 08/055,584 filed May 3, 1993, for "METHOD AND APPARATUS FOR APPLYING ANNULAR SEALS, GROMMETS, BUSHINGS, SLEEVES AND THE LIKE TO ASSOCIATED STRUCTURE".

FIELD OF THE INVENTION

This invention relates generally to the field of seals, grommets, bushings, sleeves and the like which are to be assembled onto cooperating associated structure, and more particularly to such field wherein the seals, grommets, bushings, sleeves and the like are comprised of elastomeric material and wherein the associated structure comprises a relatively elongated member onto which the seals, grommets, bushings, sleeves and the like are to be generally tightly seated.

BACKGROUND OF THE INVENTION

In many situations, as for example in the manufacture of automotive vehicles, wiring harnesses, electrical wires and/or electrical wire cables as well as rods and conduits are required to have seals, grommets, bushings, sleeves and the like applied to the exterior thereof in a manner whereby other related support structure is able to support the wiring harnesses, electrical wires, electrical wire cables, rods and/or conduits by operatively engaging such seal, grommet, bushing, sleeve.

The assembling of any of such seals, grommets, bushings, sleeves and the like onto, for example, electrical wire cables is a difficult and time consuming operation as performed by the prior art. In the situations generally already referred to, it is not unusual that a further requirement exists; that is, that the grommet, seal, etc. be positioned onto a wire cable assembly (or other carrying structure) at a specified axial location and that at such location the grommet effectively exert a squeezing action on the carrying structure to thereby preclude subsequent axial movement of the positioned and seated grommet relative to the carrying structure. To assure the squeezing or tight fit of the grommet onto, for example, the electrical wire cable, the passage formed through the grommet is, in its normal free state, of a diametrical dimension either equal to or slightly smaller than the diametrical dimension of the electrical wire cable and its sheath.

The prior art has been assembling, for example, grommets onto electrical wire cables by applying various lubricants to the surfaces, of the grommets and of the electrical wire cables, in the hope of thereby reducing the friction therebetween and, then, manually forcing the grommet onto the electrical wire cable. This prior art method requires considerable human strength and consumes what is believed to be an extraordinary length of time to finally position the grommet at the specified location along the electrical wire cable. The same applies equally well to the assembling of any of such seals, grommets, bushings, sleeves and/or the like to any of such electrical wiring cables, wiring harnesses, electrical wires, rods and/or conduits.

Accordingly, the invention as herein disclosed is primarily directed to the solution of the aforestated as well as other related and attendant problems of the prior art.

SUMMARY OF THE INVENTION

Apparatus

According to one aspect of the invention, apparatus for preparing a grommet having a passage formed therethrough wand being comprised of elastomeric material for the subsequent assembling of said grommet onto a cooperating axially extending member, comprises a source of cold temperature, mandrel means for insertion into said grommet passage and for resiliently enlarging the transverse cross-sectional area of said passage, placing said mandrel means and said grommet carried by said mandrel means into said source of cold temperature, keeping said mandrel means and said grommet in said source of cold temperature for a length of time sufficient for the resiliently enlarged cross-sectional area of said passage of said grommet to stabilize as a consequence of said cold temperature, withdrawing said mandrel means and said grommet from said source of cold temperature, and removing said grommet with its stabilized enlarged cross-sectional passage area.

Method

According to another aspect of the invention, a method for assembling a grommet having a passage formed therethrough to an associated generally axially extending carrying structure, and wherein said grommet is comprised of elastomeric material, said method comprising the steps of expanding said passage as to have said passage have an enlarged transverse cross-sectional area, maintaining said enlarged cross-sectional area while causing said grommet and said enlarged passage to become of a relatively cold temperature to thereby because of said cold temperature stabilize the enlarged cross-sectional area, and before said enlarged cross-sectional area de-stabilizes through an increase in temperature therein slipping said grommet onto said carrying structure by slidably receiving said carrying structure through said passage of enlarged transverse cross-sectional area.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views:

FIG. 10 is a side view of one form of grommet;

FIG. 11 is an axial end view taken generally on the plane of line 11—11 of FIG. 10 and looking in the direction of the arrows;

FIG. 12 is a side view of an other form of grommet;

FIG. 13 Is an axial end view taken generally on the plane of line 13—13 of FIG. 12 and looking in the direction of the arrows;

FIG. 14 is an elevational view of an associated carrying structure showing in phantom line grommets, as of FIGS. 10 and 12, placed thereon;

FIG. 15 is a fragmentary elevational view of a portion of at least one of the assemblies shown in FIG. 1 but wherein, in FIG. 1, such portion is not shown;

FIG. 16 is a view taken generally on the plane of line 16—16 of FIG. 15 and looking in the direction of the arrows;

DETAILED DESCRIPTION OF THE PREFERRED EMBODIMENT

Figure 1:
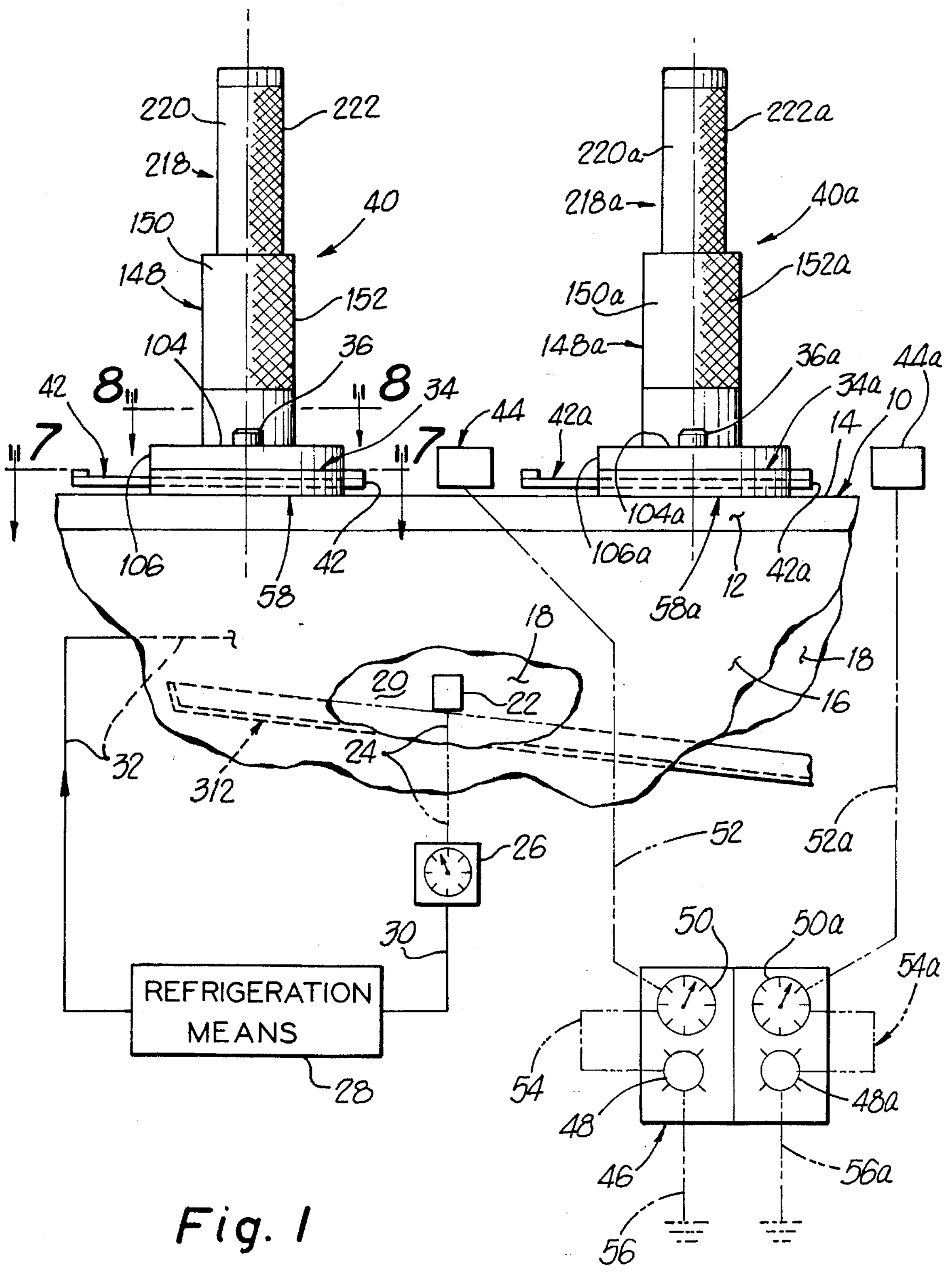
FIG. 1 illustrates, partly diagrammatically and partly schematically, apparatus employing teachings of the invention.

Referring now in greater detail to the drawings, FIG. 1 depicts, fragmentarily, a housing means or assembly 10 having, for example, an upper cover or wall 12 with a mounting surface 14. The housing assembly 10 is provided with front and rear side walls, respectively fragmentarily illustrated at 16 and 18, and cooperating bottom and end walls (not shown) which collectively define inner chamber means 20.

Suitable temperature sensor and transducer means 22, situated as within chamber 20, serves to sense the magnitude of the temperature within chamber 20 and in accordance therewith provide a signal reflective thereof along transmission means 24 operatively connected to a temperature controller or setting device 26 which, in turn, is operatively connected to suitable refrigeration means 28 as via transmission means 30.

If sensor-transducer 22 provides an output signal which indicates to the controller 26 that the temperature within chamber 20 has reached its "warm" limit, the output of controller 26 causes refrigeration means 28 to become energized and supply cooling fluid, as via transmission means 32, to chamber 20. When the sensor-transducer 22 then provides an output signal which indicates to the controller 26 that the temperature within chamber 20 has reached its "cold" limit, the output of controller 26 causes de-energization of refrigeration means 28.

A locating and holding fixture-like assembly 34 is suitably secured, as by screws 36 and 38, to the top wall or cover 12 and, in turn, serves to hold, in position, a mandrel or expander assembly 40.

As generally depicted in FIG. 1, the fixture assembly 34 is shown comprising a slide member 42 positioned as in its left-most position (as viewed in FIG. 1). When, as will be described, the slide member 42 is moved to its right-most position (as viewed in FIG. 1), the slide member 42 causes actuation of associated switch means 44.

A control or instrument panel assembly depicted at 46 may actually be, structurally, a portion of the overall housing means 10. The depicted left half of the control panel 46 may be provided with an electrically energizable lamp 48 and an adjustably selective timer means 50. Generally, as somewhat simplistically depicted, switch means 44 is operatively connected to timer means 50 via suitable transmission means 52 and the timer means 50 is operatively connected to signal lamp 48 via suitable transmission means 54 while lamp 48 may be brought to electrical ground as at 56.

The structure shown atop upper wall or cover 12 and to the right of assemblies 40 and 36 corresponds to that depicted at 40 and 36. Accordingly, all elements of such right-ward structure and associated controls which correspond to those of the left-ward structure are identified with like reference numbers provided with a suffix "a".

In considering the various details and elements comprising the base or fixture means 34, reference is now made, in particular, to FIGS. 2, 3, 4, 5 and 6.

The fixture means, or station defining means 34, comprises a bushing-like passage-defining member 58 which, preferably, has an upper disposed cylindrical disk-like body 60 radiating outwardly of an integrally formed depending cylindrical portion 62 with an axially extending passage 64 formed therethrough. In the preferred form, passage 64 is of a circular cylindrical configuration as is the outer surface 66 of portion 62.

Further, in the preferred form, the outer diameter 66 is closely received in a cooperating passage 68 of cover or upper wall 12 while the lower generally annular surface 70, of body 60, may abut against the top or upper surface 14 of upper wall 12.

Figure 2:
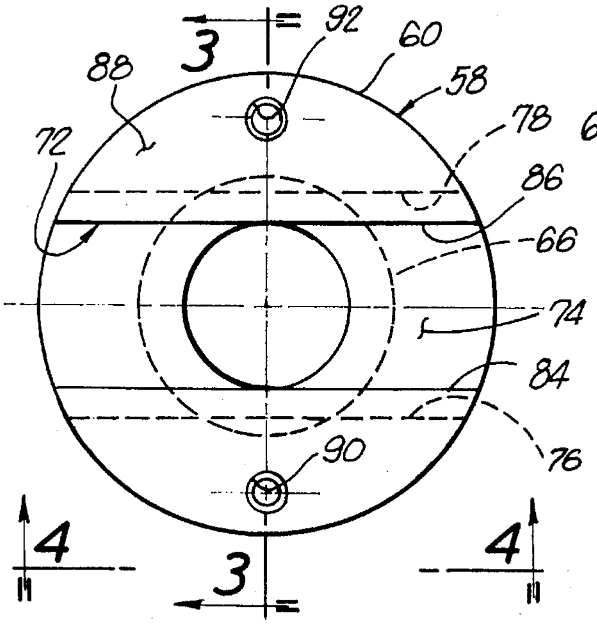
FIG. 2 is a relatively enlarged axial plan view of one of the elements partly depicted in FIG. 1.
Figure 3:
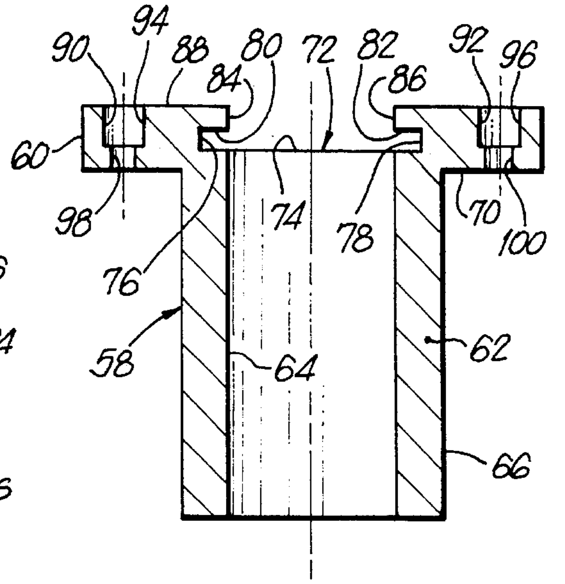
FIG. 3 is an axial cross-sectional view taken generally on the plane of line 3—3 of FIG. 2 and looking in the direction of the arrows.
Figure 4:
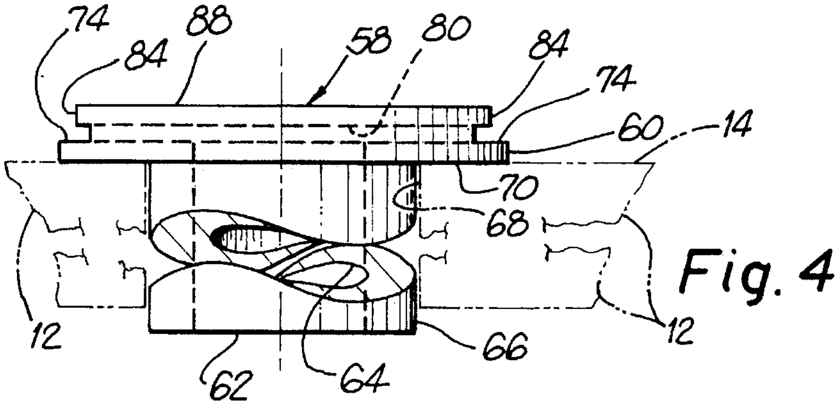
FIG. 4 is an elevational view, with a portion broken away, taken generally on the plane of line 4—4 of FIG. 2 and looking in the direction of the arrows.

As best seen in FIGS. 2 and 3, a slot-like passage or opening 72 is formed transverse to passage 64 and preferably located as to have the axis of passage 64 passing generally through the longitudinal axis of the slot passage 72. The slot passage 72 is illustrated as comprising a relatively lower disposed generally flat surface. 74 which at its respective sides terminates in side end walls 76 and 78. The side wend walls 76 and 78, in turn, respectively end at relatively short wall portions 80 and 82 which are preferably coplanar and generally parallel to relatively lower surface 74. Generally parallel wall surfaces 84 and 86 respectively span the distance between wall portion 80 and the upper surface 88 of the disk-like body 60 as well as the distance between wall portion 82 and the surface 88. In the preferred arrangement, the transverse distance between walls 84 and 86 and the diameter of passage 64 are generally the same dimension.

As shown in FIGS. 2 and 3, the bushing or base 58 has diametrically oppositely situated passages 90 and 92 formed through the flange-like portion of the body 60. Such are clearance passages for permitting the insertion therethrough of suitable screws 36 and 38 (FIGS. 1, 7, 8 and 9) for securably attaching body, locator or base 58 to the housing top wall 12. An inspection of passages 90 and 92 will reveal that each are of the counterbore type; that is, having a relatively smaller diameter at both 98 and 100 and having a relatively larger diameter at both 94 and 96 thereby defining annular shoulder or abutment portions. In the preferred embodiment, screws 36 and 38 are each shoulder type screws as generally typically illustrated in FIG. 9. As can best be seen in the relatively enlarged view in FIG. 9, the screw 38 comprises a shank portion 101 of relatively larger diameter and an axially extending threaded portion 103 of relatively smaller diameter. The threaded portion 103 is threadably engaged with a cooperating threaded portion 105 of cover or top wall 12 thereby holding the bushing or base 58 secured to housing 10 while the enlarged cylindrical shank or body 101 is received in the larger opening 96 of base 58 and while, as depicted, the upper portion of shank 101 is slidably received in arcuate slot 107 formed in upper situated flange 106. In such a condition the underside 109 of screw head 102, which may be a socket head type, is situated for operative engagement with surface 104 of flange 106 thereby preventing such flange 106 from being lifted off of base bushing 58.

In one successful embodiment of the invention the base or bushing member 58 was Comprised of Thiskol Panelyte (Panelyte Grade 260) which is formed of a base of saturating paper and phenolic resin. Such material may be obtained from, for example, Accurate Plastics, Inc., 18 Morris Place, Yonkers, N.Y., 10705.

Figure 5:
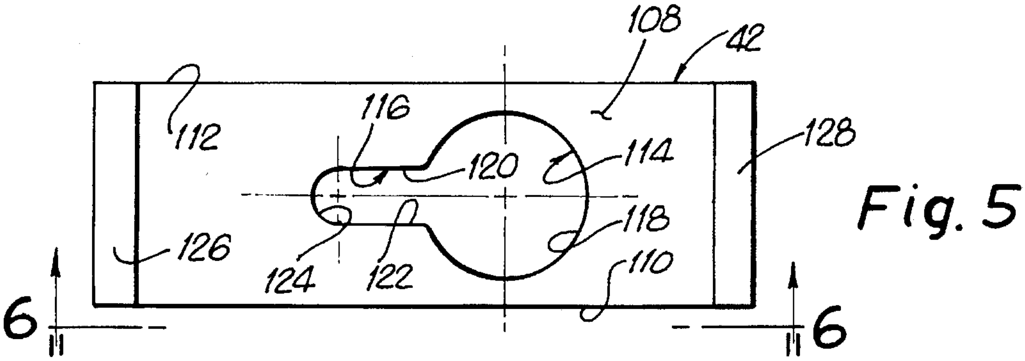
FIG. 5 is a relatively enlarged plan view of an other element partly depicted in FIG. 1.
Figure 6:
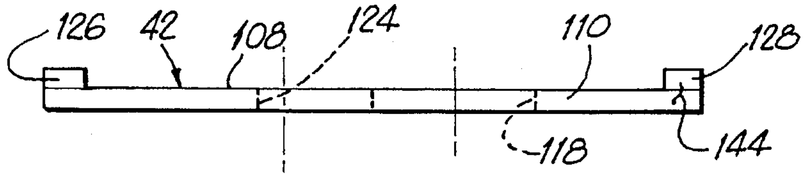
FIG. 6 is a view taken generally on the plane of line 6—6 of FIG. 5 and looking in the direction of the arrows.

Referring primarily to FIGS. 5 and 6, the slide means 42 is depicted as comprising a main body 108 of flat stock material having generally parallel sides or edges 110 and 112. The width as measured from 110 to 112 is such as to provide for sliding motion when body 108 is situated atop slot surface 74 and body edges 110 and 112 are respectively juxtaposed to end walls 76 and 78. The thickness of slide body 108 is such as to provide for sliding motion of slide body 108 when situated between lower surface 74 and upper spaced surfaces 80 and 82.

The slide body 108 is shown with a clearance passage 114 formed therethrough. Such passage 114 comprises two distinct passages 116 and 118 effectively joined to each other. Preferably, the clearance passages or openings 116 and 114 are centered generally on the medial axis of slide means or member 42. Opening 118 is circular and of a diameter equal to or approaching that of passage 64 of base 58. Opening 116 is of a slot-like configuration preferably having parallel spaced sides 120 and 122 which at one end open or blend into the circular opening 118 and, at an opposite end, are effectively joined by a spanning radiused surface 124.

The slide body 108 is also provided with generally transversely extending stop or abutment portions or members 126 and 128 respectively at opposite ends of body 108. Such abutments 126 and 128 may be secured to slide body 108 by any suitable means. In practice, one of the abutments, for example, 126 would be secured to slide body 108 and the body 108 then assembled to base 58 by sliding it into slot 72 and thereafter the second abutment 128 would be secured to the end of slide body 108. When the slide 42 is thusly assembled to base 58, the appearance thereof would be much as depicted in FIG. 7.

In one successful embodiment of the invention, the slide body 108 and each of the abutment members 126 and 128 were comprised of aluminum.

Figure 7:
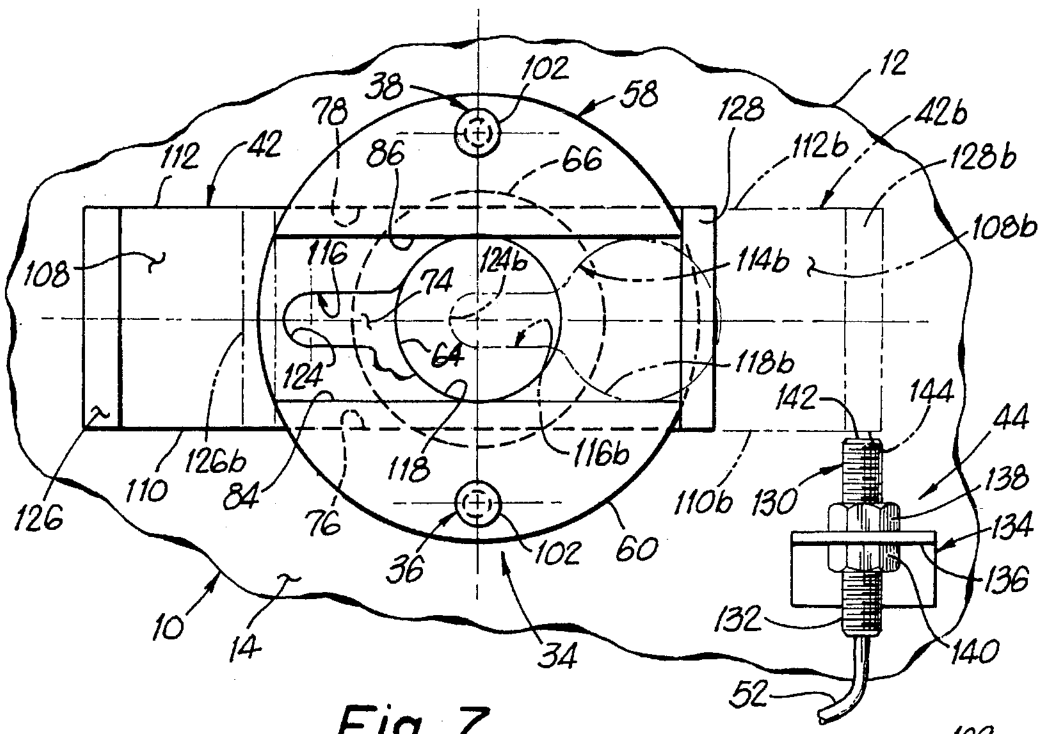
FIG. 7 is a relatively enlarged view taken generally on the plane of line 7—7 of FIG. 1 (with some of the elements of FIG. 1 not shown), and looking in the direction of the arrows.

Referring in greater detail to FIG. 7, the slide means or member 42 is depicted as having two operating positions; that is, as shown in solid line and as shown in phantom line. To more easily determine the various elements of the slide 42 when in its solid line position, the same reference numbers as employed in FIGS. 5 and 6 are used; however, in the second position of slide 42 the same reference numbers are provided with a suffix "b".

From a study of FIG. 7 it can be seen that slide means 42 attains its depicted left-most position when stop or abutment member 128 abuts as against the edges cooperatively defined by the intersection of the right end of surface 86 and outer suface of the disk-like body 60 and the intersection of the right end of surface 84 and disk-like body 60. In such left-most position of slide means 42, which may be considered a loading and unloading position, circular passage or aperture 118 of slide 42 is located in general alignment with passage 64 of base or bushing 58. The slot-like opening 116 is, of course, situated leftward of passage 64.

It can also be seen that side means 42 attains its depicted right-most position when stop or abutment member 126 abuts as at **126*b* against the edges cooperatively defined by the outer surface of the disk-like body 60 and the left ends of surfaces 84 and 86. This position may be considered a work or freezing cycle position and, at that time, the circular aperture or passage 118*b* is displaced to the right of passage 64 while the slot-like opening 116*b* and spanning radiused surface 124*b* are aligned with the axis of passage 64**.

The switch means 44 somewhat schematically depicted in FIG. 1, is more specifically disclosed, in its preferred form also at 44 of FIG. 7. The switching means or assembly 44 is depicted as comprising a transmitter-receiver (reflective) type photocell 130 which has an outer housing 132 that is externally threaded. A support bracket 134, suitably fixedly secured to the top surface 14 of upper wall 12, has an upstanding wall 136 which is provided with an aperture (not shown) formed therethrough for receiving the housing 132. A pair of cooperating nuts 138 and 140 are threadably engaged with the threaded housing 132 and respectively situated at and against opposite sides of the upstanding wall 136. As in a manner well known, nuts 138 and 140 are employed to adjustably axially position photocell 130 and, after such positioning, effectively lock the photocell 130 to wall 136 of support bracket 134. The photocell 130, which is commercially available, is axially adjusted as to place its forward open end 142 in close proximity to a juxtaposed surface portion 144 of slide means 42 when the slide 42 is in its phantom-line depicted right-most position. Also referring to FIG. 6, such surface portion 144, which serves as a reflective surface, may comprise a portion of the shown end of abutment 128 and/or a portion of edge surface 110 situated generally directly below (as viewed in FIG. 6) the end surface of abutment 128.

Figure 8:
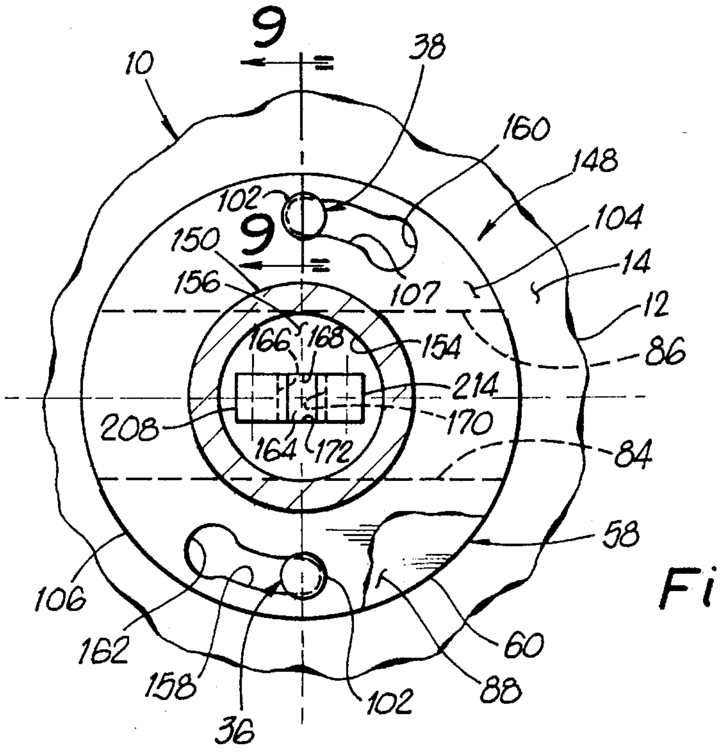
FIG. 8 is a relatively enlarged view taken generally on the plane of line 8—8 of FIG. 1 (with some of the elements of FIG. 1 not shown), and looking in the direction of the arrows.
Figure 9:
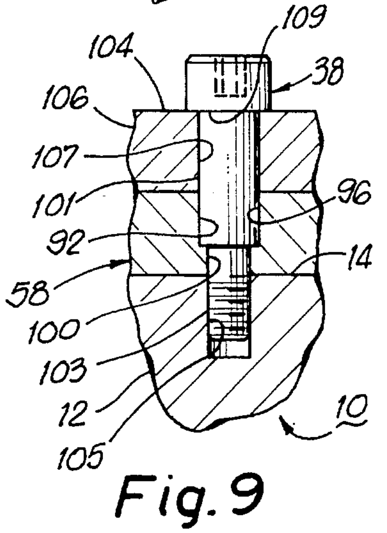
FIG. 9 is a relatively enlarged fragmentary cross-sectional view taken generally on the plane of line 9—9 of FIG. 8 and looking in the direction of the arrows.
Figure 18:
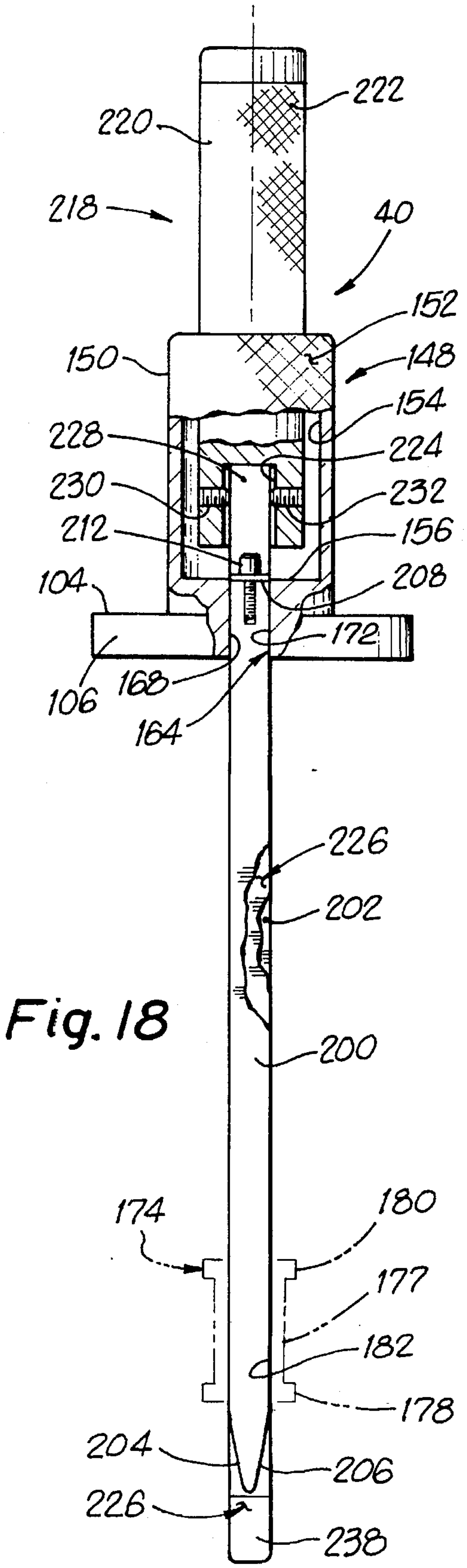
FIG. 18 is a view of the structure of FIG. 17, with portions broken away and in cross-section, taken generally on the plane of line 18—18 of FIG. 17 and looking in the direction of the arrows.
Figure 17:
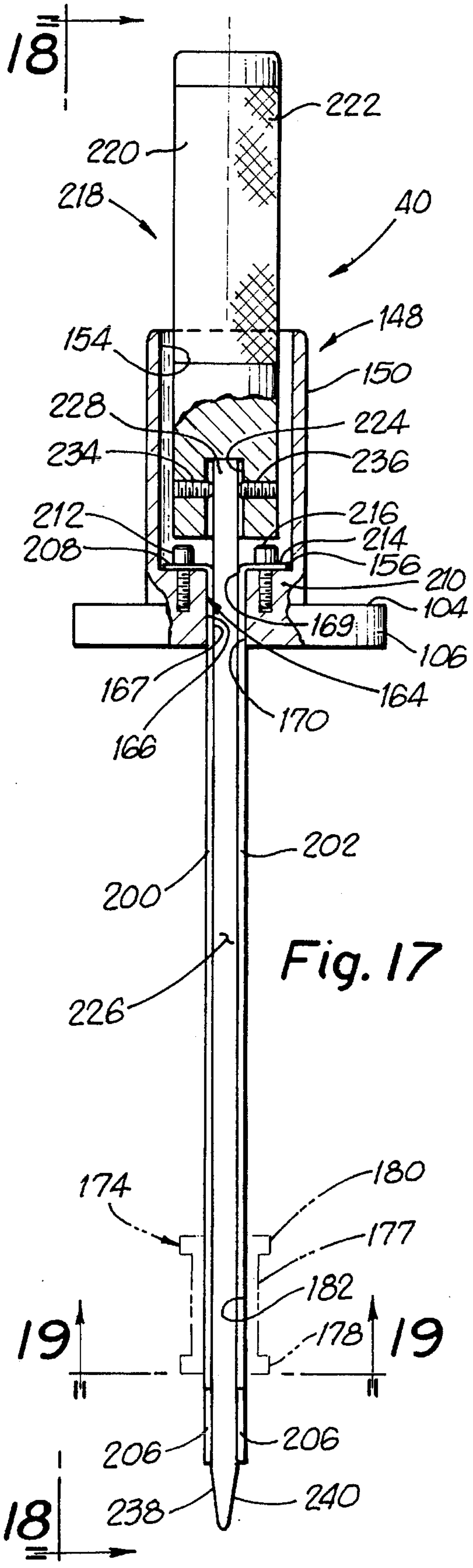
FIG. 17 is an elevational view, with portions broken away and in cross-section, of one of the assemblies depicted in FIG. 1 along with the structure shown in FIGS. 15 and 16.

The mandrel or expander means 40 comprises a first assembly 148 adapted for detachable connection to the base or fixture 58. As shown in, for example, FIGS. 1 and 8, the assembly 148 comprises a generally axially extending cylindrical portion 150, preferably provided with external knurling 152, which is integrally formed with a lower disposed (as viewed in FIG. 1) generally circular outwardly radiating flange 106. As best shown in FIGS. 8, 17 and 18, the cylindrical portion 150 is preferably bored for a portion of its axial length to thereby define an inner cylindrical surface 154 and, effectively, an axial end wall surface 156.

In addition to the arcuate slot 107, a second arcuate slot 158 is formed through flange 106 as to be located diametrically opposite to slot 107. The clockwise ends of slots 107 and 158 are respectively formed with enlarged openings 160 and 162 which are sufficiently large as to enable the screw heads 102—102 of screws 38 and 36 to pass therethrough.

In one successful embodiment of the invention, the cylindrical portion 150 and radiating flange 106 were comprised of aluminum.

As should now be apparent, with the base 58 (and slide 42 carried thereby) secured to upper wall 12 (FIG. 7), the assembly 148, in turn, can be detachably secured to the base 58. This may be done by grasping the knurled cylindrical portion 150 and moving the assembly 148 toward base 58 in a manner whereby flange 106 approaches base 58 as to have head 102 of screw 38 pass through clearance 160 and head 102 of screw 36 pass through clearance 162 (FIGS. 8 and 7). As this is done, the underside of flange 106 abuts against and rests on the upper surface 88 of base 58. Then the cylindrical section and flange 106 are rotated clockwise, as viewed in both FIGS. 6 and 7, causing the clearances 160 and 162 to respectively move away from screws 38 and 36 and the narrower portions of arcuate slots 107 and 158 to closely contain the relatively larger shank portions of screws 38 and 36. This results in the heads 102—102 of screws 38 and 36 to be positioned atop the upper surface 104 of flange 106 (as typically illustrated in FIG. 9) thereby preventing the assembly 148 from being lifted away from base 58. At this time the cylindrical extension 150 and bore 154 are in general axial alignment with passage 64 of base 58 and flange 106 may be considered as in alignment with body 60 of base 58.

Of course, when detachment of assembly 148 from base 58 is desired, all that needs to be done is to rotate cylindrical extension 150 and integrally formed flange 106 counterclockwise, as viewed in FIG. 8, until screws 38 and 36 are respectively in the enlarged openings 160 and 162 and then merely lifting the extension 150 and integrally formed flange 106 off of base 58.

As will again be referred to, the transverse wall having surface 156 is provided with a passage 164, of generally square transverse configuration, passing axially therethrough. Passage 164 is defined as by a plurality of walls or surfaces which are respectively at right angles to each other. The passage and its walls are depicted in FIG. 8 respectively at 164, 166, 168, 170 and 172.

FIGS. 10 and 12 illustrate only two of many types of elastomeric grommets, sleeves and the like. The sleeve or grommet 174 of FIG. 10 is illustrated as comprising a main tubular or cylindrical body 176 having, in this case, an outer cylindrical surface 177 with integrally formed enlarged cylindrical end portions 178 and 180. An axially extending passage 182 is formed through the end portions 178 and 180 as well as through main body 176.

The grommet or sleeve 183 of FIG. 12 is illustrated as comprising a main tubular or cylindrical body 184 having, in this case, an outer cylindrical surface 186 with integrally formed enlarged end portions 188 and 190. An axially extending passage 192 is formed through main body 184 as well as through the enlarged end portions 188 and 190. As best seen in FIG. 12, the sleeve or grommet 184 is provided with an annular recess 194 in the enlarged or head portion 190. Such recess 194 is effective to receive therein a cooperating support member, as for example a flange or wall of a related structure.

FIG. 14 is intended to convey, visually, an example of what may be required in the production of, for example, an electrical cable assembly 196 having an outer sheath 198. Only a fragmentary length of cable assembly 196 is shown such being done with the belief that the problems encountered, as in the prior art, will be clearly understood therefrom.

The dimensional line indicating a distance, $L_1$, is intended to represent related and assumed engineering specifications which require the sleeve or grommet 183 to be so located onto the cable assembly 196 as to have its axial end, of end portion 190, at said distance, $L_1$, from some reference point (not shown in the drawing). Similarly, the dimensional line indicating a distance, $L_2$, is also intended to represent related and assumed engineering specifications which require the sleeve or grommet 174 to be so located onto the cable assembly 196 as to have its axial end of end portion 180 at said distance, $L_2$, from some reference point (not shown in the drawing).

If it is assumed that in their free states each of passages 182 and 192, of sleeves or grommets 174 and 183, have a diameter of 3/16 inch (4.76 mm.) and that the outer diameter of the cable assembly 196 is ¼ inch (6.35 mm.) a diametrical interference of 1/16 inch (1.59 mm.) exists preventing such grommets or sleeves from being merely slid onto and alone the cable assembly 196. In the prior art, respective leading ends of passages 182 and 192 must somehow be somewhat enlarged, and possibly the receiving end of cable assembly 196 somehow compressed so that each of the sleeves or grommets 174 and 183 can, in turn, be made to start onto and about the cable assembly 196. The prior art has also provided various lubricants on the cable assembly 196 and into the passages, as 182 and 192, of the grommets or sleeves in an attempt to initially get the sleeves or grommets onto the cable assembly 196 and then move them to locations as determined, for example, by $L_1$ and $L_2$. Such prior art methods are very slow and require considerable manual strength in achieving the required engineering specifications; i.e., the specified locations of the sleeves or grommets on the cable assembly.

As will be shown, by practicing the invention, these same sleeves or grommets can be easily and quickly applied to the specified locations along the cable assembly 196 resulting in production speeds far greater than can be achieved by the prior art.

Referring now to FIGS. 8, 15, 16, 17 and 18, the assembly 148 is illustrated as further comprising a pair of elongated preferably flat stock spring steel blade-like members 200 and 202 which, at their respective free ends are preferably tapered as typically shown at 204 and 206 of FIG. 18. As shown in both FIGS. 8 and 17, the respective upper ends (as viewed in FIG. 17) of blade-like members 200 and 202 are formed-over and against the end wall surface 156. In particular the upper end portion 208 of blade 200 is bent over and against the end wall surface 156, of the end wall portion 210, and secured thereto as by a screw 212 threadably engaged with the end wall portion 210. Similarly, the upper end portion 214 of blade 202 is bent over and against the end wall surface 156, of the same end wall portion 210, and secured thereto as by a screw 216 threadably engaged with the end wall portion 210. The size of the opening or passage 164 is preferably such as to closely confine both blade-like members 200 and 202 to thereby keep them at least mostly aligned with each other when viewed in a direction as that of FIG. 18.

The mandrel or expander means 40 of FIG. 1 also comprises a second assembly 218 adapted for cooperative insertion into assembly 148. As shown in, for example, FIGS. 1, 17 and 18, the second assembly 218 comprises a generally axially extending cylindrical handle and body portion 220 preferably provided with external knurling 222. In one successful embodiment of the invention handle and body portion 220 was comprised of aluminum.

As best seen in FIGS. 17 and 18, the lower end (as viewed in either FIGS. 17 or 18) of cylindrical body 220 is provided with a blind passage or recess 224 intended for the reception therein of an upper portion of an expander bar 226 which is preferably comprised of stainless steel. In the preferred embodiment and as employed in one successful embodiment of the invention, the expander bar 226 is solid in cross-section and of a rectangular configuration and not of a square configuration. The upper portion 228 received within chamber 224 is fixedly retained therein as by set screws 230, 232, 234 and 236. The lower (as viewed in FIGS. 17 and 18) or free end of expander rod or member 226 is preferably provided with a tapered contour as generally depicted at 238 and 240.

Now, for purposes of further description, let it be assumed that the expander assembly 218 (i.e., 220 and 226) is withdrawn from the cooperating assembly 148 (i.e., 150, 106, 200 and 202). With the expander member 226 thusly totally withdrawn from between the blade-like members 200 and 202 configurations as that generally depicted in FIGS. 15 and 16 may be achieved.

In their free state, the blades 200 and 202 are relatively easily flexed whereby the free ends thereof may be brought into contact with each other as best seen in FIG. 15.

Now with the blades 200 and 202 brought together as generally depicted in FIG. 15 (FIG. 16 being a side view thereof), the sleeve or grommet 174, as an example, will be placed onto and about such blades. It was previously arbitrarily assumed (for purposes of description) that passage 182 has a diameter of 3/16 inch (4.76 mm.) when grommet or sleeve 174 is in its normal free state. Let it be further assumed that when sleeve 174 is in its normal free state: (a) the diameter of body 177 is 7/16 inch (11.11 mm.) and (b) the diameter of each of end portions 178 and 180 is 9/16 inch (14.29 mm.). Also, let it be assumed that the square dimension, OW, of the blades 200 and 202, when cooperating with expander rod 226, is 9/32 inch (7.14 mm.) and, as previously assumed, that the diameter of the cable assembly, or carrier structure 196 is 1/4 inch (6.35 mm.).

With the foregoing assumed dimensions, reference is primarily made first to FIGS. 15 and 16.

In FIG. 16 the grommet or sleeve 174, in its free state, is depicted being started onto the deflected blades 200, 202 of FIG. 15 and is shown at the moment that the cylindrical surface of passage 182, at its shown upper end, engages the tapered end 206, 204 of both blades 202 and 200. At this depicted moment of engagement or contact, grommet 174 has not yet undergone any forced resilient expansion and is still in its normal free state. In FIG. 15, the grommet 174 has been drawn to illustrate its relationship to the same ends of blades 200 and 202 at the moment that the depicted relationship of FIG. 16 is attained. Of course, the grommet 174 of FIG. 15 is in its normal free state.

In comparing FIGS. 15 and 16, it can be seen that in the view taken by FIG. 16 the grommet 174, while still in its free state, does touch the tapered portions 206, 204 of both blades 202 and 200 and that any further movement of grommet 174, in a direction toward and onto blades 202 and 200 will cause a progressively greater resilient expansion of grommet passage 182 as well as the rest of the grommet 174. However, such resilient expansion occurs primarily in directions transverse, as indicated by arrows, A, to the blades 202 and 200. If it is assumed that grommet 174 is pushed onto blades 202 and 200 as to a position depicted at "C", the outer diameters of portions 180 and 178, as measured in the plane of the drawing, may now be 5/8 inch (15.88 mm.), the diameter of body portion 177, as measured in the plane of the drawing, may now be 1/2 inch (12.70 mm.) and the diameter of passage 182, also as measured in the plane of the drawing, may now be equal to OW which was previously assumed to be 9/32 inch (7.14 mm.).

Employing the same sequence of pushing the grommet 174 onto the blades 200 and 202 but referring primarily to FIG. 15, it can be seen that at the moment when grommet 174 initially touches tapered portions 206 and 204 of blades 200 and 202 as depicted in FIG. 16, there exists substantial space as between the relatively broad flat side of blade 202 and the juxtaposed surface of passage 182 and that there also exists a substantial space as between the relatively broad flat side of blade 200 and the juxtaposed surface of passage 182. Consequently, as grommet 174 is urged onto blades 200 and 202, the blades being of spring steel further progressively deflect toward each other as the grommet 174 is brought to the "C" position or location, and for the most part the grommet 174 does not undergo resilient expansion in directions generally transverse to the blades of FIG. 15 and depicted by arrows, B. When grommet 174 reaches its position or location "C" in FIG. 15 (corresponding to location "C" of FIG. 16): the outer diameters of portions 178 and 180, as measured in the plane of the drawing, may each now be 1/2 inch (12.70 mm.); the outer diameter of body 177, as measured in the plane of the drawing, may now be 13/32 inch (10.32 mm.); and the inner passage 182 diameter, also as measured in the plane of the drawing, may now be 3/32 inch (2.38 mm.).

In view of the foregoing it can be seen that resilient expansion of a grommet or sleeve initially pushed onto the blades 200 and 202 is primarily in one plane or single direction (depicted by arrows, A) and that in a direction depicted by arrows B, which is at right angle to the direction of arrows A, the physical size of the grommet may actually become smaller than its normal free state. This feature makes it easier to apply the resilient grommet to the coacting blades 200 and 202 since the energy expended is directed primarily to single direction expansion of the resilient grommet and, further, at least a portion of such resilient expansion is supplied by the material of the grommet which at least tends to move closer to the blades 200 and 202, as described with regard to FIG. 15, thereby providing a degree of what may be considered excess or extra grommet material for undergoing the expansion in the direction depicted in and explained with regard to FIG. 16.

Once the grommet or sleeve 174 is situated on the blades 200 and 202 as generally depicted in FIGS. 15 and 16, the expander assembly 218 (FIGS. 1, 17 and 18) is brought into operative relationship with assembly 148. Such is accomplished as by gripping handle 220, with expander rod or means 226 suitably secured thereto, and inserting expander member 226 through the passage 164 collectively defined by wall surfaces 168, 172 (FIG. 18) and wall surfaces 167 and 169 (being the inwardly located broad flat surfaces of blades 200 and 202—FIG. 17). As the expander rod 226 is progressively inserted downwardly (as viewed in FIGS. 17 and 18) the passage 164 effectively continues to guide expander rod 226 between opposite blades or arms 200 and 202 and, in so doing, move the blades 200 and 202 away from each other, as initially viewed in for example FIG. 15, to where such blades 200 and 202 are made to be in a fully expanded condition as depicted in FIG. 17. Such expansion by expander 226 in effect causes the grommet 174 of FIG. 15 to undergo resilient expansion in the direction of arrows B and thereby bring about a full two directional resilient expansion of grommet 174.

Figure 19:
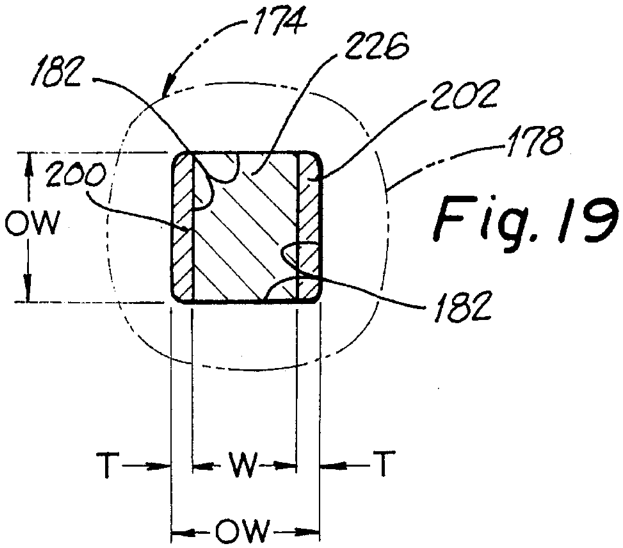
FIG. 19 is a relatively enlarged cross-sectional view taken generally on the plane of line 19—19 of FIG. 17 and looking in the direction of the arrows.

As generally depicted in the relatively enlarged FIG. 19, the cross-sectional configuration of the expander 256 and cooperating blades 200 and 202 is a square and the surface of the inner passage 182 of grommet 174 has been resiliently expanded as to be close to or in contact with the outer cross-sectional configuration shown in FIG. 19. In FIG. 19, the thickness, T , of each blade 200 and 202 added to the relatively narrower width, W , of expander rod 226 equals an overall width, OW, which, as shown, generally equals the overall width, in the other direction, of the width of blades 200, 202 and of the expander rod 226.

Figure 20:
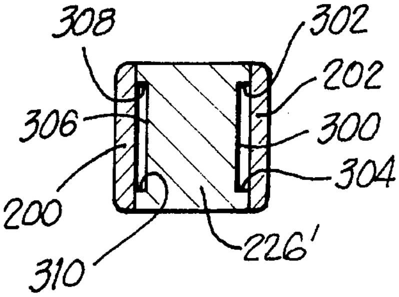
FIG. 20 is a view similar to that of FIG. 19 but illustrating, in greater detail, a preferred form of one of the elements.

FIG. 20, of a scale generally equal to that of FIG. 19, further illustrates a preferred embodiment of the expander rod or member 226'. The expander rods 226 and 226' of FIGS. 19 and 20 may be considered to be functionally equivalent to each other except that rod 226' has its opposed faces, respectively juxtaposed to blades 200 and 202 modified when compared to expander 226. In particular the face of expander 226', which is juxtaposed to blade 202, is formed with a medially extending recess 300 which, in turn, defines spaced rib-like or rail-like portions 302 and 304. Similarly, the face of expander 226', which is juxtaposed to blade 200, is provided with a medially extending recess 306, similar to 300, and which, in turn, defines rib-like or rail-like portions 308 and 310. Such ribs or rails which preferably extend for the full length of the expander bar 226' present a relatively small surface area against juxtaposed blades 200 and 202 thereby effectively minimizing any resisting frictional forces as may occur when the expander rod or member 226' is slid between wand against the opposed blades 200 and 202.

OPERATION OF THE INVENTION

In one successful embodiment of the invention, the chamber 20 of housing 10 was maintained at a nominal temperature of (–) 40° F. with a range of (+) 0.0° F. and (–) 10.0° F. resulting in a range of (–) 40° F. to (–) 50° F. Consequently, in such embodidment when the temperature sensor-transducer 22 senses the attainment of (–) 40° F. the refrigeration means 28 is cycled as to lower the temperature within chamber 20 and such continues until the temperature sensor-transducer 22 senses the attainment of (–) 50° F. at which time the refrigeration means 28 is de-energized.

Next, the slide means 42 (FIGS. 1 and 7) would be moved to its left-most position (shown in solid line in FIG. 7) thereby having the slide opening 118 in general alignment with passage 64 of base or bushing 58.

At this point, it is assumed that the grommet or sleeve 174 has been placed onto and in two directions resiliently expanded by the coacting blades 200 and 202 and expander member 226 as to thereby have the grommet or sleeve 174 situated on and carried by the overall expander means 40 of FIG. 17 (or FIG. 18).

The entire expander means or assembly 40, with the grommet 174 carried thereby, would be moved to be generally above the slide 42 and the bushing or base 58 as to be in general axial alignment with slide opening 118 and bushing passage 64. The blades 200 and 202, expander bar 226 and the grommet 174 would then be lowered through opening 118 and passage 64 into chamber 20 with such downward movement continuing until screw heads 102—102 of screws 38 and 36 respectively pass through openings 160 and 162 and flange 106 abuts or seats against upper surface 88 of bushing or base 58 at which time the assembly 40 is rotated clockwise (as viewed in FIG. 8) thereby locking assembly 148 to bushing 58 as previously explained. When thusly seated and locked, slide 42 is moved to the right (as viewed in FIG. 7) placing the depending blades 200, 202 and expander bar 226 within the confines of slot-like opening 116 (as shown moved to **116*b*) and positioning the reflective surface portion 144 of slide 42 in juxtaposition to photocell 44. As a consequence photocell 44, via conductor means 52, causes energization of timer means 50 (FIG. 1). In the one successful embodiment of the invention, it was found that exposure of the grommet 174, to the cold of chamber 20, for a span of time in the order of 2.0 minutes was sufficient to stabilize the grommet 174; i.e., eliminate its characteristic resilience. Accordingly, when 2.0 minutes have expired, from the moment of energization of timer means 50, the timer means 50 brings about the energization of related sensory signal means which is depicted as lamp or bulb means 48**.

With the grommet 174 now frozen (and without perceptible resilience) the entire assembly 40 is withdrawn from chamber 20 and bushing or base 58. This may be done by moving the slide means 42 back to the left-most position (as viewed in FIG. 7), rotating assembly 148 counter-clockwise to position screws 38 and 36 in openings 160, 162 and lifting the entire assembly 40 and frozen grommet 174 carried thereby out of the bushing or seat 58. Once the entire assembly 148 is thusly withdrawn, the stabilized grommet 174 is slidably removed from the coacting blades 200, 202 and expander 226.

Instead of the manner just described, the stabilized grommet 174 may be removed from the mandrel assembly 40 in the following way. That is, after the grommet 174 has been sufficiently stabilized in chamber 20, instead of moving the slide 42 back to its left-most position (FIG. 7) the slide 42 is permitted to remain in its right-most location. The mandrel assembly 40 is rotated counter-clockwise to unlock it from base 58 and lifted out of chamber 20 and base 58. In so doing the coacting blades 200, 202 and expander bar 226 pass through slide slot opening 116 (at location **116*b* of FIG. 7). However, the stabilized grommet 174, being of a cross-sectional configuration significantly greater than that of cooperating blades 200, 202 and expander 226, does not pass through slot opening 116*b* but instead abuts against the under-side (chamber 20 side) of slide 42 and is taken off the blades 200, 202 and expander 226. The frozen grommet 174 is permitted to drop as onto suitable floor or tray means 312 within or defining a portion of chamber means 20. The fragmentarily depicted tray or track means 312 is shown in an inclined position so as to thereby enable such frozen grommets 174 as fall onto the means 312 to roll, slide and/or tumble to the right (as viewed in FIG. 1) to some suitable area of access from where an operator may obtain the frozen grommets for completing further steps with such. After the mandrel assembly 40 is withdrawn from base or bushing 58, the slide 42 is again returned to its left-most position (FIG. 7) to make ready for the next insertion into chamber 20** of the grommet to be stabilized.

Regardless of how the frozen stabilized grommets are obtained from the chamber 20, having the resiliency and general conformation of such grommets stabilized produces certain stabilized dimensions in the frozen grommet which are different from the related dimensions when the grommet is in its normal free state.

Previously herein certain dimensions were assumed for purposes of discussion and illustration. It was assumed that:

A) each of passages 182 and 192 of sleeves or grommets 174 and 173, when in a normal free state, had a diameter of 3/16 inch (4.76 mm.);

B) the outer diameter of cable assembly 196 was ¼ inch (6.35 mm.); and

C) when the grommet is placed onto the blades 200, 202 and expander 226 (as depicted in FIGS. 16 and 19) the passage as 182 was forced to undergo resilient enlargement as to conform to the outer periphery of the coacting blades 200, 202 and expander 226. When the thusly situated grommet is frozen and stabilized, as already described, the expanded (and now non-resilient) passage 182 will have a cross-sectional area equal to or even slightly greater than the outer dimensions, OW, of the cooperating blades and expander as depicted in FIG. 19. It has previously been assumed that each dimension, OW, is equal to 9/32 inch (7.14 mm.). Therefore, the frozen and stabilized grommet, as 174, now has its passage 182 of generally square configuration, in transverse cross-section, and the opening provided by such enlarged passage 182 is equal to 9/32 inch by 9/32 inch.

With the dimensions previously assumed, it was shown that neither of the grommets 174, 183 could be easily placed onto and about the cable assembly 196; in fact it was shown that a diametrical interference of 1/16 inch existed between the outer diameter of cable assembly 196 and passages 182 and 192 preventing the easy assembly of any of the grommets onto the cable assembly 196.

In comparison, with grommets frozen and stabilized as described, the passages 182 and 192 have been first resiliently expanded and then stabilized, by freezing, resulting in 182 and/or 192 being generally square passages of a 9/32 by 9/32 inch dimension. Since the outer diameter of cable assembly 196 is established as being ¼ inch (6.35 mm.) while the passages of stabilized grommets have a width and height of 9/32 inch (7.14 mm.), such stabilized grommet passages are a minimum of 1/32 inch (0.79 mm.) larger than the outer diameter of cable assembly 196. This, in turn, enables the easy assembly of any and all of such stabilized grommets with the carrier or cable assembly 196 as well as the easy and quick placement of such grommets at required locations as depicted by dimensions $L_1$ and $L_2$ of FIG. 14.

The stabilized grommets, upon being removed from the cold chamber 20, start absorbing heat from the ambient and in the usual normal working environment of, for example, a factory, such stabilized grommets return to their normal and free states and dimensions in about 45.0 seconds after removal from the cold chamber 20. When this occurs to grommets already assembled onto an associated carrier, for example cable assembly 196, the grommets lock themselves onto the carrier and, for all practical purposes, are immovable with respect to such carrier.

Figure 21:
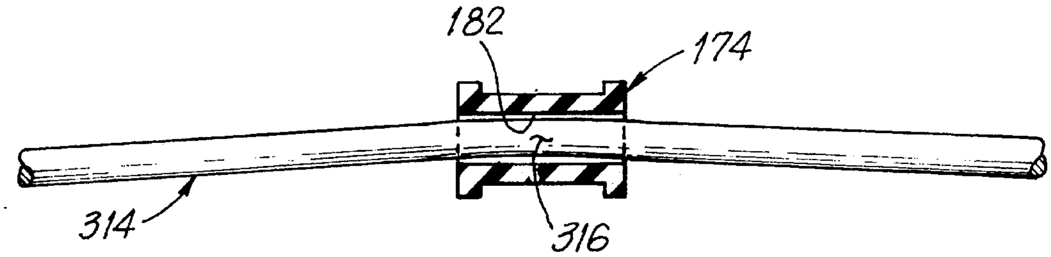
FIG. 21 illustrates a fragmentary portion of a rod or conduit which has a bend formed therein and a grommet positioned at or passing over such bend.

FIG. 21 illustrates a fragmentary portion of a rod, conduit or other tubular member 314 which is formed with a bend portion 316. In situations wherein a work-piece or grommet 174 is to be assembled, in a resiliently locked condition, to the carrier 314, and wherein in the process of assembly the grommet 174 has to pass about the bend portion 316, the prior art method would result in at least a high degree of binding between the grommet and the carrier 314 in the vicinity of the bend portion 316.

However, by practicing the invention, such a binding action is easily eliminated. That is, in FIG. 21 the grommet 174 has gone through the inventive process of having its inner passage 182 resiliently expanded, as by the mandrel means 40, to a preselected cross-sectional area and configuration and then stabilized by freezing as within the chamber 20. As depicted in FIG. 21, the stabilized passage 182 is of a configuration and size large enough to pass about the bend portion 316 without experiencing any binding action with carrier 314. When the stabilized grommet 174 is thusly moved to its required location with respect to carrier 314, the stabilized grommet 174, by absorbing sufficient heat has its resilient characteristic returned which, in turn, enables the grommet, in its normal free state, to grippingly seat onto the carrier 314.

Figure 23:
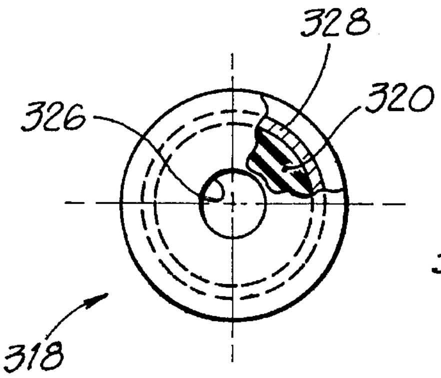
FIG. 23 is an axial end view, with a portion broken away and in cross-section, taken generally on the plane of line 23—23 of FIG. 22 and looking in the direction of the arrows.
Figure 22:
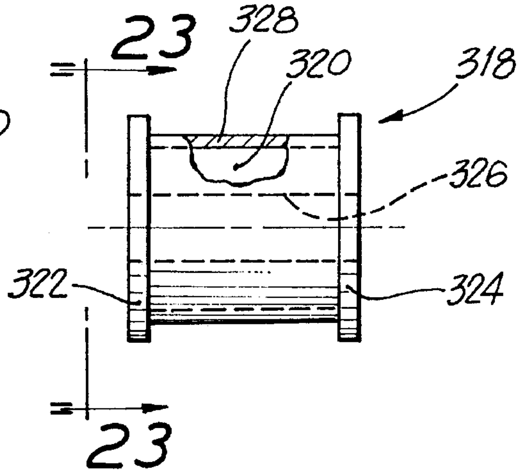
FIG. 22 is a side elevational view of a grommet provided with an outer confining body.

The grommets or work-pieces hereinbefore disclosed are formed of elastomeric material and are not bound or contained by an associated confining means. FIGS. 22 and 23 illustrate a generally cylindrical grommet 318 comprised of a main body 320 of elastomeric material and integrally formed generally outwardly radiating cylindrical end portions 322 and 324. An axially extending passage 326 is formed therethrough and a confining cylindrical band 328 of non-elastomeric material, such as a band of plastics material or metal is situated about and against the elastomeric body 320. The fact that a grommet or work-piece as 318, may be comprised of an outer generally encircling confining means, as 328, does not preclude the passage 326 thereof from being resiliently enlarged and then, by exposure to a freezing temperature, become stabilized as taught by the invention herein disclosed.

The mandrel assembly **40*a* of FIG. 1 operates and functions in the same manner as described with reference to the mandrel assembly 40. Also, the fixture means 34*a*, comprising a base or bushing 58*a* and slide 42*a*, functions in the same manner as already described fixture means 34, base 58 and slide 42**.

FIG. 1 illustrates the overall inventive apparatus as comprising only two stations one of which comprises 40 and 34 and the other of which comprises **40*a* and 34*a***. However, in the one successful embodiment of the invention many more than two stations were employed permitting the rapid and high volume production of stabilized grommets.

Referring to FIGS. 19, 8, 17 and 18 it can be seen that in the preferred embodiment of the invention a physical polar relationship exists as between guide passage 164 (FIGS. 8, 17 and 18) and the expander rod or member 226. That is, since guide passage 164 is square and since opposite walls of such square guide passage 164 have portions of respective blades or mounting members 200, 202 thereagainst, the distance between such blades or mounting members can be represented, generally, by dimension W of FIG. 19. Consequently, the distance between the other opposed walls 168 and 172 of guide passage 164 is comparatively greater and can be represented, generally, by the vertically extending dimension OW of FIG. 19. Therefore, when expander rod 226 is to be inserted into the opening of passage 164, defined by passage surfaces 168, 172 (FIG. 8) and surfaces 167 and 169 (FIG. 17) the expander member 226 may be operatively inserted in the depicted position or only if axially rotated 180° from the depicted position.

As should be apparent, the various dimensions, times and temperatures disclosed herein are by way of example and not limitation. The temperature of chamber means 20, the minimal length of time that a grommet is exposed to the cold temperature of chamber means 20 and the cross-sectional dimensions of the resiliently deflectable blades or mounting members 200, 202 and expander 226 may all be varied to achieve the desired stabilized dimensions as well as to accommodate such factors as, for example, the sizes and thicknesses of the particular grommets or work-pieces employed.

In the claims, the term "grommet" is employed in at least a somewhat generic sense. That is, in the claims, the term "grommet" is intended to cover and read on any and all articles which have a passage formed either partially or fully therethrough wherein such passage is defined by elastomeric material. As should be apparent from the teachings disclosed herein, it matters not, to the inventive apparatus and method, whether the article is intended to later function as or serve the purposes of an annular seal, bushing, sleeve and the like. The invention can be applied to all of such articles in the manner herein disclosed.

Although only a preferred embodiment and selected modifications of the invention have been disclosed and described, other embodiments and modifications of the invention are possible within the scope of the appended claims.

What is claimed is:

1. Apparatus for enlarging the transverse cross-sectional area of a passage formed in a work-piece which is comprised of elastomeric material and temporarily maintaining the cross-sectional area to which said passage has been enlarged, comprising mandrel means for insertion into said passage of said work-piece and for expanding the transverse cross-sectional area of said passage by resiliently expanding the elastomeric material defining said passage, wherein said mandrel means upon expanding the transverse cross-sectional area of said passage being effective to carry said work-piece on said mandrel means, a chamber for maintaining a cold atmosphere therein at a temperature sufficient to freeze said elastomeric material, said chamber comprising access means for enabling said mandrel means and said work-piece carried thereby to pass through said access means and present said work-piece to said cold temperature in said chamber as to bring about the freezing of said elastomeric material thereby dimensionally stabilizing said expanded transverse cross-sectional area of said passage, and wherein upon said elastomeric material being dimensionally stabilized said mandrel means is effective to undergo separation from said work-piece.

2. Apparatus according to claim 1 and further comprising timer means for timing the length of time that said work-piece is presented to said cold temperature and upon the expiration of a preselected span of time being effective to cause a signal to be produced.

3. Apparatus according to claim 1 wherein said access means comprises a seat and a clearance passage formed therethrough communicating with said chamber, wherein said mandrel means in presenting said work-piece to said cold temperature in said chamber extends through said clearance passage and abuts against said seat, and further comprising timer means for timing the length of time that said work-piece is presented to said cold temperature and upon the expiration of a preselected span of time being effective to cause a signal to be produced.

4. Apparatus according to claim 3 and further comprising sensory signal generating means, and wherein said timer means is operatively connected to said signal generating means.

5. Apparatus according to claim 1 and further comprising a housing, wherein said housing comprises said chamber, wherein said access means comprises a seat carried by said housing, a clearance passage formed through said seat and communicating with said chamber, a slide member carried by said seat and having at least first and second operating positions, wherein when said slide member is in said first operating position said mandrel means and work-piece carried thereby ware permitted to pass from externally of said housing through said clearance passage and into said chamber, and wherein when said slide member is in said second operating position said mandrel means and work-piece carried thereby are not permitted to pass from externally of said housing through said clearance passage and into said chamber.

6. Apparatus according to claim 5 wherein said slide member is able to move to said second operating position after said mandrel means and work-piece carried thereby have from externally of said housing passed through said clearance passage and into said chamber.

7. Apparatus according to claim 5 and further comprising timer means, wherein said slide means is effective when in said second operating position to cause energization of said timer means, and wherein upon the expiration of a preselected span of time next following initiation of energization of said timer means said timer means is effective to cause a signal to be produced.

8. Apparatus according to claim 5 wherein said slide member comprises an aperture formed therethrough, wherein said aperture comprises a relatively large aperture portion and a relatively small aperture portion distinct from each other but opening into each other, wherein when said slide member is in said first operating position said relatively large aperture portion is in functional alignment with said clearance passage, and wherein when said slide member is in said second operating position said relatively small aperture portion is in functional alignment with said clearance passage.

9. Apparatus according to claim 6 wherein when said slide member is moved to said second operating position after said mandrel means and work-piece carried thereby have from externally of said housing passed through said clearance passage and into said chamber, said mandrel means is capable of being withdrawn out of said chamber and clearance passage but said work-piece carried by said mandrel means is not permitted to be withdrawn out of said chamber and clearance passage.

10. Apparatus according to claim 8 wherein said relatively large aperture is of a size sufficient to permit the passage therethrough of said mandrel means and work-piece carried thereby, and wherein said relatively small aperture is of a size sufficient to permit the passage therethrough of said mandrel means but not said work-piece when carried by said mandrel means.

11. Apparatus according to claim 1 wherein said mandrel means comprises a first generally axially elongated resiliently deflectable mounting member, a second generally axially elongated resiliently deflectable mounting member, wherein said first mounting member comprises first and second ends, wherein said mounting member comprises first and second ends, wherein said first and second mounting members are juxtaposed to each other as to have said first ends juxtaposed to each other and as to have said second ends juxtaposed to each other, wherein said first ends of said first and second mounting members are spaced a preselected distance from each other and wherein said second ends are resiliently deflectable toward and away from each other, wherein said first mounting member comprises an inner disposed surface, wherein said second mounting member comprises an inner disposed surface, wherein said inner disposed surfaces of said first and second mounting members generally face each other, wherein said first mounting member comprises an outer disposed surface carried by said first mounting member as to be disposed thereon generally oppositely to said inner disposed surface of said first mounting member, wherein said second mounting member comprises an outer disposed surface carried by said second mounting member as to be disposed thereon generally oppositely to said inner disposed surface of said second mounting member, wherein when said second ends are resiliently deflected toward each other said work-piece may be placed onto said first and second mounting members by having said resiliently deflected second ends inserted into said passage of said work-piece in a manner whereby at least portions of said outer disposed surfaces of said first and second mounting members are juxtaposed to the elastomeric material of said work-piece defining the surface of said passage, and further comprising an expander member, said expander member being slidable against said inner disposed surfaces of said first and second mounting members, said expander member when slid along said inner disposed surfaces a distance sufficient to become between said second ends of said first and second mounting members being effective to move said second ends away from each other whereby said at least portions of said outer disposed surfaces are forced against said surface defining said passage of said work-piece and thereby expand said cross-sectional area of said passage of said work-piece.

12. Apparatus according to claim 11 wherein each of said first and second mounting members are formed of relatively thin flat-stock spring steel, wherein the thickness of said flat-stock spring steel is only a small fraction of the width of said flat-stock, wherein the width of said first mounting member formed of said flat-stock spring steel is generally equal to the width of said second mounting member formed of said flat-stock spring steel.

13. Apparatus according to claim 12 wherein the width of said first mounting member and the width of said second mounting member determine the extent and a first direction of expansion of said passage of said work-piece, wherein said expander member and the thicknesses of said first and second mounting members collectively determine the extent and a second direction of expansion of said passage of said work-piece, and wherein said first and second directions are generally normal to each other.

14. Apparatus according to claim 11 wherein said expander member is slidably received between said first ends of said first and second mounting members.

15. Apparatus according to claim 12 wherein said expander member is elongated, wherein the cross-sectional width of said expander member is generally equal to the width of each of said first and second mounting member, wherein said expander member comprises a plurality of elongated sides, wherein a first of said plurality of elongated sides is juxtaposed to said inner disposed surface of said first mounting member, wherein a second of said plurality of elongated sides is juxtaposed to said inner disposed surface of said second mounting member, wherein said first elongated side comprises a first generally medially situated elongated relieved portion providing first and second transversely spaced elongated bearing surfaces for slidably engaging said inner disposed surface of said first mounting member, and wherein said second elongated side comprises a second generally medially situated elongated relieved portion providing third and fourth transversely spaced elongated bearing surfaces for slidably engaging said inner disposed surface of said second mounting member.

* * * * *

UNITED STATES PATENT AND TRADEMARK OFFICE
CERTIFICATE OF CORRECTION

PATENT NO. : 5,581,865

DATED : December 10, 1996

INVENTOR(S) : Terry M. Will

It is certified that error appears in the above-identified patent and that said Letters Patent is hereby corrected as shown below:

Column 2, line 11, delete "wand" and substitute therefor --- and ---.

Column 3, line 20, cancel "Is" and substitute therefor --- is ---.

Column 4, line 64, between "surface" and "74" delete the period (.).

Column 11, line 44, after "between" delete "OW".

Column 16, line 8 (Claim 5, line 9 thereof), change "ware" to --- are ---.

Column 16, line 59 (Claim 11, line 6 thereof), between "said" and "mounting" insert --- second ---.

Signed and Sealed this

Fourth Day of March, 1997

*Attest:*

Bruce Lehman

BRUCE LEHMAN

*Attesting Officer*

*Commissioner of Patents and Trademarks*